United States Patent [19]

Morse

[11] Patent Number: 5,148,699
[45] Date of Patent: Sep. 22, 1992

[54] STUFFING BOX LEAK DETECTOR

[75] Inventor: Robert L. Morse, Tulsa, Okla.

[73] Assignee: Pollution Control Specialty, Inc., Oklahoma City, Okla.

[21] Appl. No.: 814,761

[22] Filed: Dec. 30, 1991

[51] Int. Cl.$^5$ ............... G01M 3/04; E21B 33/03; F16J 15/00; F16K 41/02

[52] U.S. Cl. .................................. 73/40; 166/84; 277/2

[58] Field of Search ............... 277/2; 166/84; 73/40, 73/46, 49.8

[56] References Cited

U.S. PATENT DOCUMENTS

| | | |
|---|---|---|
| 3,209,830 | 10/1965 | Orr et al. ........................ 166/84 |
| 4,071,085 | 1/1978 | Grable et al. ................... 166/84 |
| 5,067,563 | 11/1991 | Rode ............................... 166/84 |

Primary Examiner—Hezron E. Williams
Assistant Examiner—George Dombroske
Attorney, Agent, or Firm—Molly D. McKay; William S. Dorman

[57] ABSTRACT

The invention is a wellhead stuffing box leak detector including a split-ring adapter which is installed between the stuffing box and the stuffing box cover. The leak detector functions to contain liquids which leak out of the well through the stuffing box and diverts the leakage via an overflow tube to a clear fluid reservoir. The fluid reservoir is provided with a float that moves upward when the fluid level in the fluid reservoir rises, thus activating a switch which can be used to trigger an alarm or to turn motors or engines on or off.

9 Claims, 4 Drawing Sheets

STUFFING BOX LEAK DETECTOR

BACKGROUND OF THE INVENTION

1. Field of the Invention

The present invention relates to a leak detector for attachment on a stuffing box of a rod pumped well. More particularly, the present invention relates to a leak detector with a reservoir for containing fluid leakage from around a polish rod liner which is located within the stuffing box. The reservoir is provided with a switch which is activated by a given level of fluid in the reservoir, said switch providing a means for shutting down the well's pump. Alternately or additionally, the switch can be utilized to send a signal remotely to notify an operator that the well needs attention.

2. The Prior Art

Preliminary searches were conducted on the invention disclosed herein, and the following patents were uncovered in the searches:

| Pat. No. | Inventor | Issue Date |
| --- | --- | --- |
| 3,270,810 | Johnston | Sept. 6, 1966 |
| 3,276,246 | Truman, et al. | Oct. 4, 1966 |
| 3,815,925 | Mattoon | June 11, 1974 |
| 3,914,752 | Howard, et al. | Oct. 21, 1975 |
| 3,955,822 | Irby | May 11, 1976 |
| 3,967,678 | Blackwell | July 6, 1976 |
| 4,135,859 | Carson, et al. | Jan. 23, 1979 |
| 4,516,911 | Senghaas, et al. | May 14, 1985 |
| 4,647,050 | Johnson | Mar. 3, 1987 |
| 4,917,190 | Coppedge | Apr. 17, 1990 |
| 4,951,743 | Henderson | Aug. 28, 1990 |

Reciprocating rod arrangements are commonly utilized in connection with such devices as pumps and compressors acting on gases or liquids; for example, oil well pumping units where a polish rod is reciprocated within a wellhead by the up and down action of the pumping unit's horse head to which the polish rod is clamped.

Rod pumped wells have a packing gland system at the wellhead, commonly called a stuffing box, with seals or packing to prevent leakage from passing out of the stuffing box from around the reciprocating rod. The reciprocating rod in an oil well is commonly called a polish rod and is generally provided with a sleeve-type liner in the area of the stuffing box to protect the polish rod from wear caused by constantly rubbing against the seals or packing within the stuffing box.

Even though seals in a stuffing box may be very effective when new, as they wear, due to the reciprocating action of the rod or rod liner through the packing or seal, leakage will occur between the packing or seals and the rod or rod liner. Furthermore, while the extent of the leakage may not be sufficient to cause the well to be shut down in order to replace the seal or packing due to the associated reduction in production or potential damage to the equipment, even small amounts of leakage, i.e. oil, salt water, etc., into the surrounding environment creates a measurable amount of pollution.

Thus, frequent servicing of the packing or seal around the reciprocating rod liner becomes necessary to prevent leakage that would otherwise be considered inconsequential from an operational or economic standpoint. Thus, while it is known to provide stuffing boxes with leak detectors (see Truman, et al., U.S. Pat. No. 3,276,246), many such arrangements merely serve to stop operation of the well once excessive leakage occurs and do not deal with the leakage occurring under circumstances where except for the environmental and safety concerns there is no need to cease operations.

Even of these devices which detect excess leakage, some, such as U.S. Pat. No. 4,647,050 by Johnson and U.S. Pat. No. 4,917,190 by Coppedge, have only a visual indicator, such as a sight glass or pressure gauge, of leakage with no provision to automatically shut down the well's operation.

Some leak detectors, such as U.S. Pat. No. 4,135,859 by Carson, et al. have no visual means of detecting oil leakage other than disassembling the device. Inability of the operator to view the inside of the fluid retaining vessel without disassembling would limit the opportunity for preventive maintenance on the stuffing box seals.

The Carson patent also has another problem. The switch on this device is activated by the weight of liquid within a collecting reservoir. The weight of the liquid pulls on a spring and activates the switch. However, when exposed to a high vibration environment, this type of switch can be activated by the vibration alone, even without a sufficient amount of liquid in the reservoir to activate the switch, thus resulting in unnecessary down time of the well.

Installation and serviceability have been other problems with the prior art leak detectors. Some are not split assemblies and, therefore, require the polish rod to be disconnected from the horse head to allow the leak detector to be installed, serviced, or replaced. A good example of a leak detector having this installation problem is U.S. Pat. No. 3,967,678 by Blackwell.

The Blackwell patent also illustrates another problem with some prior art leak detectors. The Blackwell leak detector adds considerable length to the stuffing box assembly which can interfere with the reciprocation of the polish rod.

Durability has also been a problem with prior art leak detectors For example, U.S. Pat. No. 3,270,810 by Johnston, which appears to be made of sheet metal, would be unable to support the weight of the rod and would probably be ruined if the rod accidentally dropped onto it.

Another example of a leak detector with durability problems is U.S. Pat. No. 4,951,743 by Henderson. The Henderson patent provides a bellows-type containment around the polish rod which expands and contracts with each reciprocation of the polish rod. Such continued folding and unfolding of the bellows would eventually result in a breach of the containment which would require replacement of the bellows.

The remaining patents listed above are not considered sufficiently pertinent to require comment.

The present invention overcomes the shortcomings of the prior art by providing a split assembly adapter which can be easily and securely installed onto the stuffing box without adding significant length to the stuffing box. The split nature of the adapter allows the complete leak detector to be removed prior to major workovers, thus minimizing the chance of damage to any part of the leak detector. The adapter, machined from steel or made from other suitably rigid material, is sufficiently rugged to support the weight of the polish rod or to withstand the impact of a rod string dropping onto it.

The adapter is attached to a reservoir holder containing electrical connections; a fluid reservoir removably attaches to the reservoir holder. The reservoir holder can be detached from the adapter without disturbing any of the electrical connections, thus minimizing the possibility of damage during periodical work on the well, such as changing out the downhole pump or pulling rods to replace a broken rod.

The invention has a transparent or translucent fluid reservoir which enables the operator to see when he needs to perform preventive maintenance but which prevents leakage contained within the fluid reservoir from entering the surrounding environment. The invention's reservoir is provided with a long travel float-type switch which can be used to terminate operation of the well when activated. This float-type switch is not as susceptible to variation in point of activation caused by vibration as are weight activated switches.

SUMMARY OF THE INVENTION

The present invention is a leak detector having a split-ring adapter and split seals and gaskets which allow the leak detector to be installed between the stuffing box and the stuffing box cover without disconnecting the polish rod from the pumping unit. An overflow connection tube connects the adapter to a reservoir holder which is attached to a clear fluid reservoir, thus providing communication between the interior of the adapter and the interior of the fluid reservoir. Leakage from the stuffing box enters the adapter, flows through the connection tube and reservoir holder, and accumulates in the interior of the fluid reservoir. The reservoir holder is provided with a float assembly which hangs down into the interior of the fluid reservoir. As fluid accumulates in the fluid reservoir, the float assembly moves upward, activating a switch which can be used to initiate an alarm or to turn motors or engines on or off.

On grease-lubricated wells, a crown ring is used between the stuffing box and the adapter to prevent grease from entering the leak detector. On oil-lubricated wells, an oil supplying reservoir can be connected to the adapter instead of the street ell as a means of introducing additional lubricating oil into the interior of the adapter.

For added security against spills, a larger anti-pollution tank can be connected to the fluid reservoir to provide additional overflow volume for fluid containment.

DETAILED DESCRIPTION OF THE PREFERRED EMBODIMENTS

Figure 1:
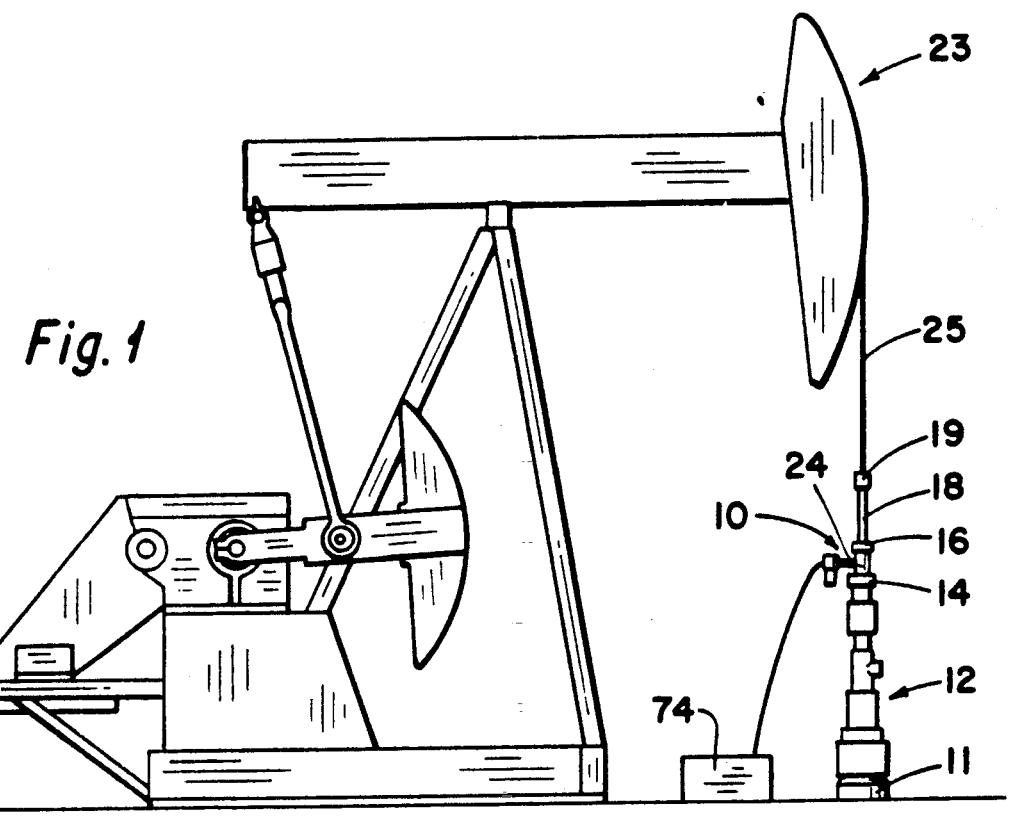
FIG. 1 is a side elevation of a well and pumping unit with a leak detector made in accordance with a preferred embodiment of the invention shown installed on the well's stuffing box.

Referring to the drawings and initially to FIG. 1, there is illustrated a stuffing box leak detector generally designated by the reference numeral 10. Leak detector 10 is installed on a wellhead 12 of well 11 between a stuffing box 14 and a stuffing box cover 16. The purpose of the leak detector 10 is to detect and contain leakage at the stuffing box 14 from around a polish rod 18 or, if one is in use, from around a polish rod liner (not shown), which is a protective sleeve often clamped around a polish rod 18 in the area where the polish rod 18 reciprocates within t he stuffing box 14. Leakage can occur at the stuffing box 14 when stuffing box packing seals (not shown) located within the stuffing box 14 become worn due to reciprocation of the polish rod 18 or the polish rod liner (not shown) within the stuffing box 14. The polish rod 18 has two ends, a lower end (not shown) and an upper end 19. The lower end (not shown) connects to a rod string (not shown) within the well 11, and the upper end 19 is connected to cables 25 which attach to a pumping unit 23.

Figure 2:
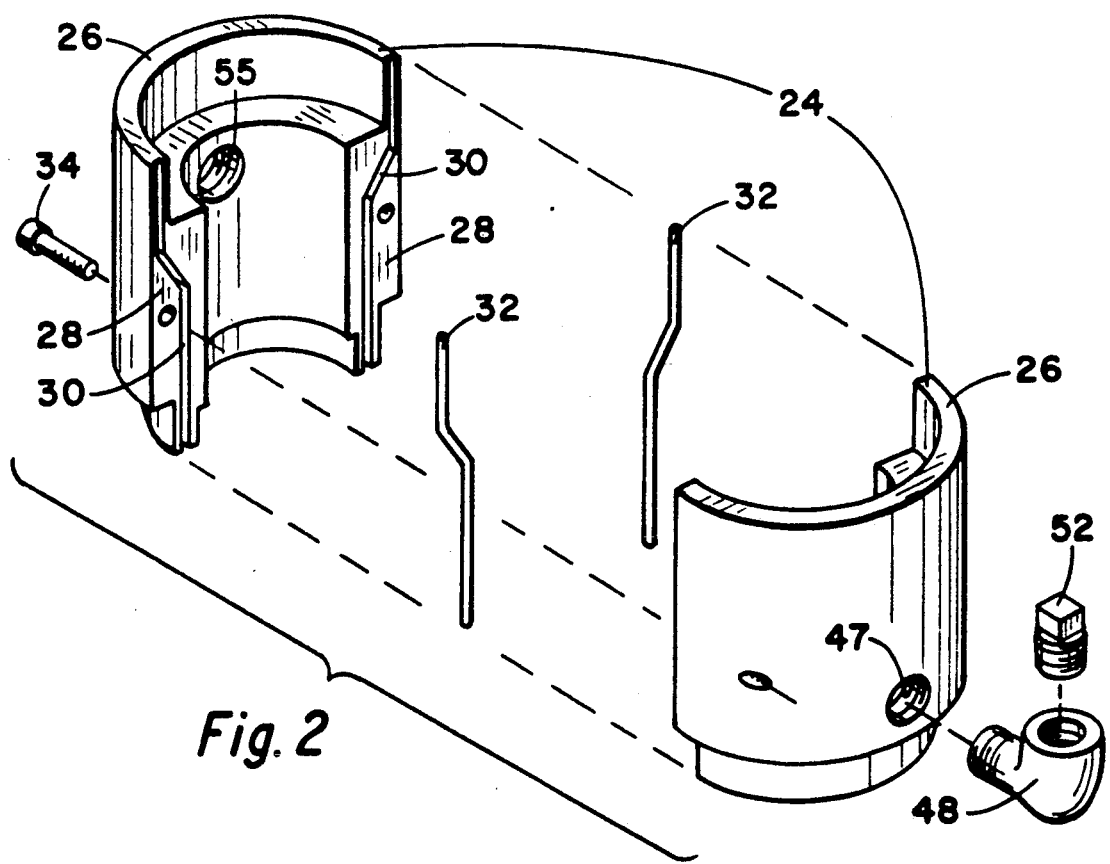
FIG. 2 is an exploded view of the adapter portion of a leak detector made in accordance with a preferred embodiment of the invention.

The leak detector 10 is installed between the stuffing box 14 and the stuffing box cover 16 by means of a split-ring adapter 24. FIG. 2 illustrates how the adapter 24 splits into two halves 26 to enable its installation around the polish rod 18 or the polish rod liner (not shown) without having to disconnect the polish rod 18 from the pumping unit 23. The halves 26 fit together along the longitudinal surfaces 28. Said surfaces 28 on one half 26 are provided with seal grooves 30 along their length. Said seal grooves 30 contain spline seals 32 made from O-ring stock or other suitable material which seal to form an interior 31, shown in FIG. 3, of the adapter 24 which is liquid-tight when the two halves 26 are fastened tightly together along their surfaces 28. The halves 26 can be fastened together by means of allen head cap screws 34 inserted through the two halves 26 or by other suitable fastening means.

Figure 4:
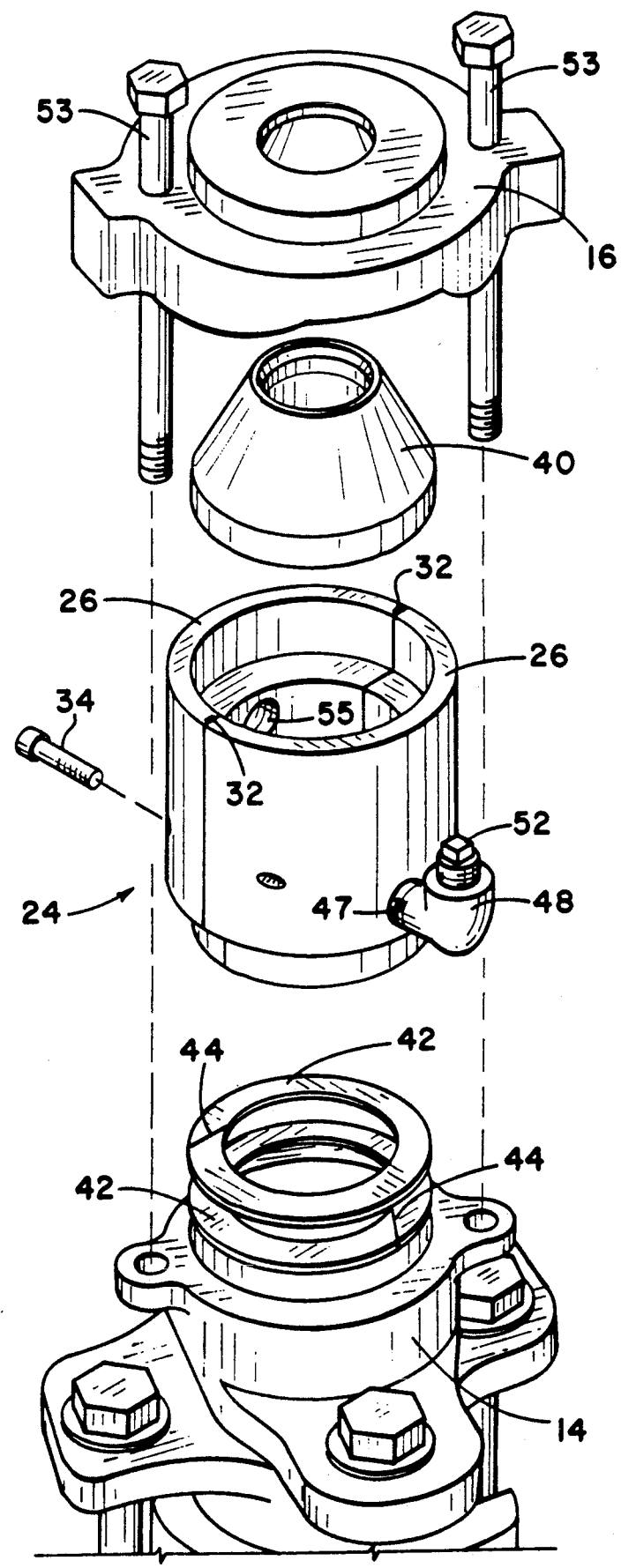
FIG. 4 is an exploded view of the installed adapter portion of a leak detector made in accordance with a preferred embodiment of the invention which has been configured for use with oil as the lubricant.

Referring now to FIG. 4, to install the adapter 24 on the stuffing box 14, old bolts (not shown) securing the stuffing box cover 16 to the stuffing box 14 are removed and the cover 16 is raised off of the stuffing box 14. A piece of wire (not shown) or other suitable means can be used to hold the cover 16 away from the stuffing box 14 while the adapter 24 is being installed. Normally a new stuffing box packing rubber 40, which is provided with the leak detector 10, is installed between the cover 16 and the adapter 24, replacing one of the existing stuffing box packing seals (not shown). Installation of the stuffing box packing rubber 40 is facilitated by a split (not shown) in the packing rubber 40. Such split construction is standard for stuffing box packing seals (not shown).

Also, two rubber gaskets 42 are inserted between the adapter 24 and the stuffing box 14. Each gasket 42 has a split 44 in it to allow it to be installed around the polish rod 18 or the polish rod liner (not shown) without disconnecting the polish rod 18 from the pumping unit 23. The split 44 of one gasket 42 is positioned 180° from the split 44 of the other gasket 42, thus discouraging leakage at the splits 44 in the gaskets 42.

The well 11 may utilize either oil or grease as the lubricant between the stuffing box packing seals (not shown) and the reciprocating polish rod 18 or polish rod liner (not shown). The leak detector 10 can be easily adapted for use with either type of lubricant.

Figure 5:
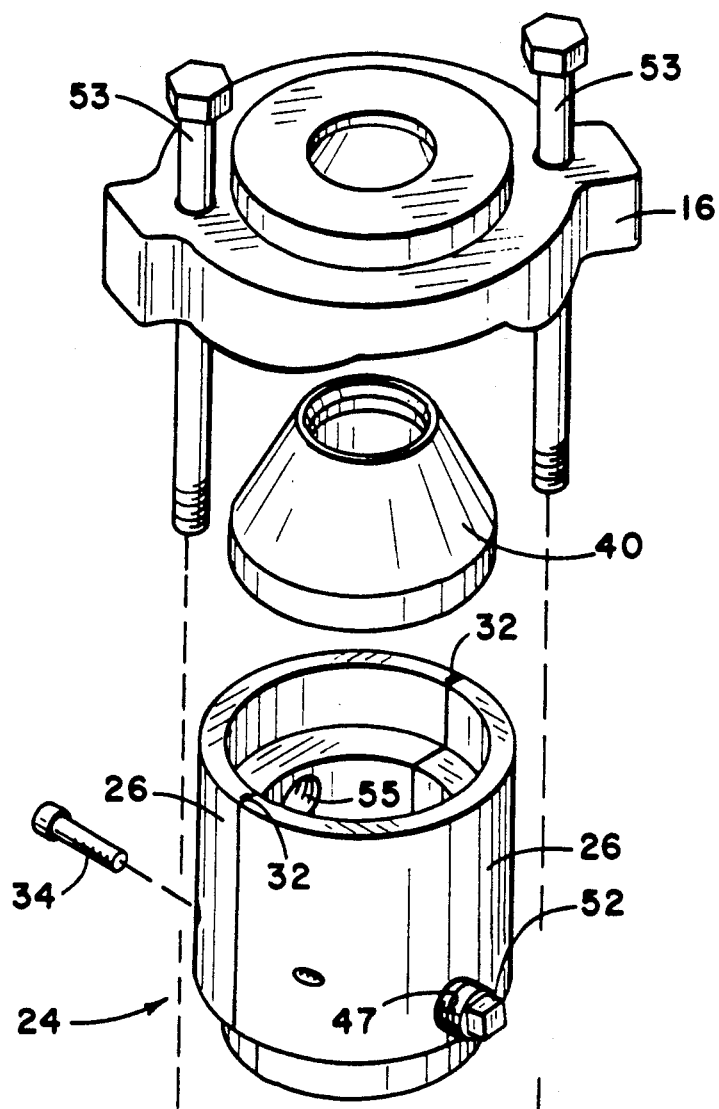
FIG. 5 is an exploded view of the installed adapter portion of a leak detector made in accordance with a preferred embodiment of the invention which has been adapted for use with grease as the lubricant.

Referring now to FIG. 5, when grease is utilized as the lubricant, a crown ring 46 is installed between the adapter 24 and the gaskets 42 to prevent grease from entering the adapter 24. The stuffing box 14 normally has a grease nipple (not shown) through which lubricating grease is introduced into the stuffing box 14.

Referring again to FIG. 4, when oil is utilized as the lubricant, one of the halves 26 is provided with a lubricating hole 47 into which a street ell 48 fits, said street ell 48 communicates with the interior 31 of the adapter 24. Said street ell 48 can be used by the pumper for introducing lubricant to the interior 31 of the adapter 24. When not being used to introduce lubricant, said street ell 48 can be closed off with a plug 52. Alternately, an oil supplying reservoir (not shown) can be used in the lubricating hole 47 instead of the street ell 48 as a means of increasing the volume of the lubricating oil. Also, as shown in FIG. 5, the lubricating hole 47 can be fitted with the plug 52 to adapt a half 26 which contains hole 47 for use when grease is utilized as the lubricant.

The previously described adaptions to the leak detector 10 are the only ones required to accommodate the different types of lubricants utilized at the wellhead 12. The following described features apply to a leak detector 10 suitable for a well 11 either lubricated with oil or grease.

Once the adapter 24 is assembled and the proper seals and gaskets 32, 40, 46, and 42 are in place, new longer bolts 53 replace the old bolts (not shown) and are used to tighten and seal the adapter 24 between the stuffing box 14 and the stuffing box cover 16.

Figure 3:
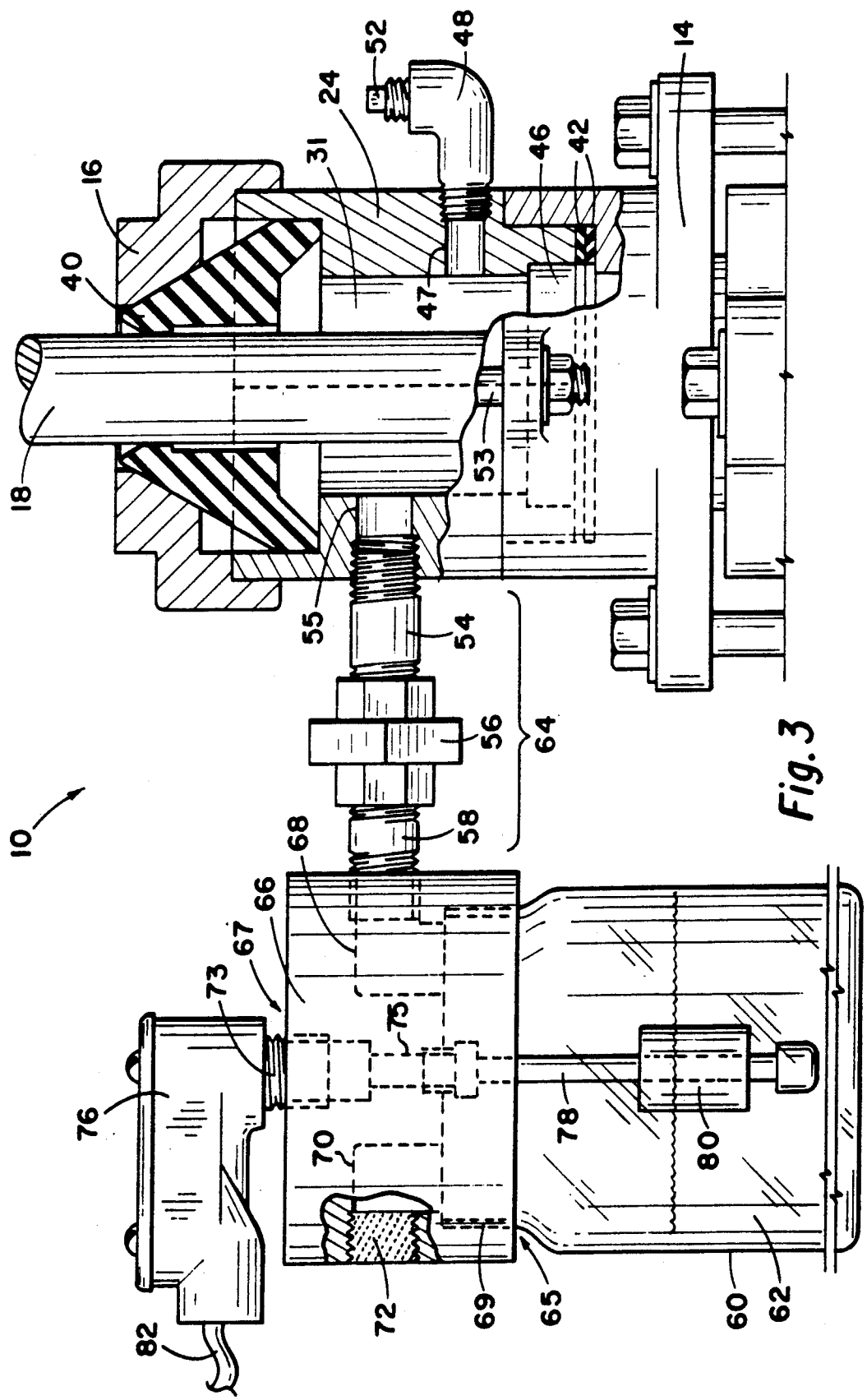
FIG. 3 is a side elevation of a leak detector made in accordance with a preferred embodiment of the invention shown installed on the well's stuffing box.

Referring to FIG. 3, one of the halves 26 is provided with an overflow hole 55 into which an adapter nipple 54 fits, said adapter nipple 54 communicates with the interior 31 of the adapter 24. A union 56 having two ends is attached on one end to the adapter nipple 54 and attached on the other end to a reservoir nipple 58. Said reservoir nipple 58 attaches to a reservoir holder 66 by means of a first access hole 68 in the reservoir holder 66 and communicates through the reservoir holder 66.

The holder 66 may be made of black Delrin ® or other suitable material. Said holder 66 has a bottom side 65 and a top side 67. Said bottom side 65 is provided with threads 69 where it attaches to a fluid reservoir 60 having an interior 62, thus allowing the fluid reservoir 60 to be twisted onto or off of the holder 66 similar to the way a Mason jar is screwed onto or off of a lid which is held stationary. In fact, the threads 69 on holder 66 are designed so that a Mason jar (not shown) can be used temporarily as an emergency replacement part for the fluid reservoir 60. The fluid reservoir 60 is made of a clear, transparent or translucent material such as glass or oil-resistant plastic through which an operator can see anything which may be contained within the interior 62.

The interior 31 of the adapter 24 communicates successively through the adapter nipple 54, the union 56, the reservoir nipple 58, and the reservoir holder 66 to the interior 62 of the fluid reservoir 60. Collectively the union 56 and the two nipples 54 and 58 are referred to as the overflow connection tube 64. When the well 11 utilizes oil as the lubricant, lubricating oil added to the adapter 24 is maintained at a level just below the overflow connection tube 64, thus preventing lubricating oil from overflowing to the interior 62 of the fluid reservoir 60.

The holder 66 has a second access hole 70, identical to the first hole 68, located 180° from the first hole 68. This second hole 70 may be filled with an open-cell nylon insect screen 72 which prevents insects (not shown) and other small objects (not shown) from entering the fluid reservoir 60 while allowing air to flow in or out of the fluid reservoir 60, preventing the fluid reservoir 60 from exploding or imploding.

Alternately, the second hole 70 can switch functions with the first hole 68 in the event the first hole 68 becomes damaged.

Finally, the second hole 70 can be connected to an anti-pollution tank 74, shown in FIG. 1, said anti-pollution tank 74 being a large fluid reservoir designed to retain a spill should a severe leak occur which would exceed the capacity of the fluid reservoir 60. Excess fluid from the fluid reservoir 60 travels to the anti-pollution tank 74 by gravity flow. The anti-pollution tank 74 can be equipped to automatically pump its fluid contents into a flow line (not shown) against pressure and then return to atmospheric pressure to accept additional fluids from the fluid reservoir 60.

The anti-pollution tank 74 is an optional accessory for the leak detector 10, and is designed to be used in those locations where environmental considerations or other operating conditions warrant its addition.

Referring again to FIG. 3, the reservoir holder 66 is provided with an entrance hole 75 extending all the way through the reservoir holder 66 and separately threaded on the top side 67 and on the bottom side 65. A pipe nipple 73 to which an entrance ell 76 is attached fits into the entrance hole 75 on the top side 67 and a float assembly 78 is fitted into the entrance hole 75 on the bottom side 65; said float assembly 78 being located in pendant fashion within the interior 62 of the fluid reservoir 60. Said float assembly 78 is associated with a float switch (not shown) which is activated when sufficient fluid accumulates in the interior 62 of the fluid reservoir 60 to cause a float 80 on the float assembly 78 to move upward toward the bottom side 65 of the reservoir holder 66.

The entrance ell 76 serves as a conduit through which electrical connections 82 run from the float switch (not shown) to alarms (not shown), to mechanisms (not shown) for turning off the pumping unit 23, or for a combination of alarms (not shown) and mechanisms (not shown) for turning off the pumping unit 23. Mechanisms (not shown) for turning off the pumping unit 23 can be designed for the pumping unit 23 when the pumping unit 23 is driven by either an electrical motor (not shown) or by an internal combustion motor (not shown).

Whereas, the present invention has been described in particular relation to the drawings attached hereto, it should be understood that other and further modifications, apart from those shown or suggested herein, may be made within the spirit and scope of this invention.

What is claimed is:

1. A stuffing box leak detector designed to be installed on a wellhead around a polish rod and between a stuffing box and a stuffing box cover comprising a split ring adapter, means for sealing the adapter around the polish rod, means for sealing the adapter between the stuffing box and the stuffing box cover, said adapter having a sealed interior, a reservoir holder provided with first and second access holes and an entrance hole, an overflow connection tube having two ends, one end being attached to the adapter and communicating with its interior, the other end being attached to the reservoir holder via the first access hole, said reservoir holder having a top side and a bottom side, said bottom side being removably connected to a fluid reservoir, said fluid reservoir having an interior, said overflow connection tube communicating with the interior of the reservoir, an entrance ell connected to the reservoir holder via a pipe nipple inserted in the entrance hole on the top side of the reservoir, a float assembly inserted in the entrance hole on the bottom side of the reservoir holder, said float assembly provided with a float switch, said float switch having electrical connections which extend through the reservoir holder via the entrance ell.

2. A leak detector according to claim 1 further comprising a split-ring adapter having two halves, the halves meeting at longitudinal parallel surfaces, said parallel surfaces having seal grooves containing spline seals, the halves being secured together by means of screws, a stuffing box packing rubber being located between the stuffing box cover and the adapter, split lower gaskets being located between the adapter and the stuffing box, bolts attached to the stuffing box and the stuffing box cover for securing the adapter between the stuffing box and the stuffing box cover.

3. A leak detector according to claim 2 adapted for oil-lubricated wells further comprising the adapter provided with a hole into which a street ell inserts, said street ell communicating with the interior of the adapter.

4. A stuffing box leak detector according to claim 2 adapted for grease-lubricated wells further comprising a crown ring located between the adapter and the split lower gaskets.

5. A stuffing box leak detector according to claim 1 wherein the second access hole is located 180° from the first access hole on the reservoir holder to provide versatility in usage of each access hole.

6. A stuffing box leak detector according to claim 1 further comprising an anti-pollution tank connected to the fluid reservoir by means of the second access hole.

7. A stuffing box leak detector according to claim 1 further comprising a screen inserted in the second access hole.

8. A stuffing box leak detector according to claim 7 wherein the screen is an open-cell nylon screen.

9. A stuffing box leak detector according to claim 1 wherein the fluid reservoir is constructed of material which permits light to pass through it so that the contents of the fluid reservoir are visible without removing the fluid reservoir from the reservoir holder.

* * * * *